O. G. SHURTLEFF.
PIPE LAYING MACHINE.
APPLICATION FILED JULY 9, 1915.

1,188,336.

Patented June 20, 1916.
2 SHEETS—SHEET 1.

Witnesses

Inventor
Oliver G. Shurtleff,
By Victor J. Evans
Attorney

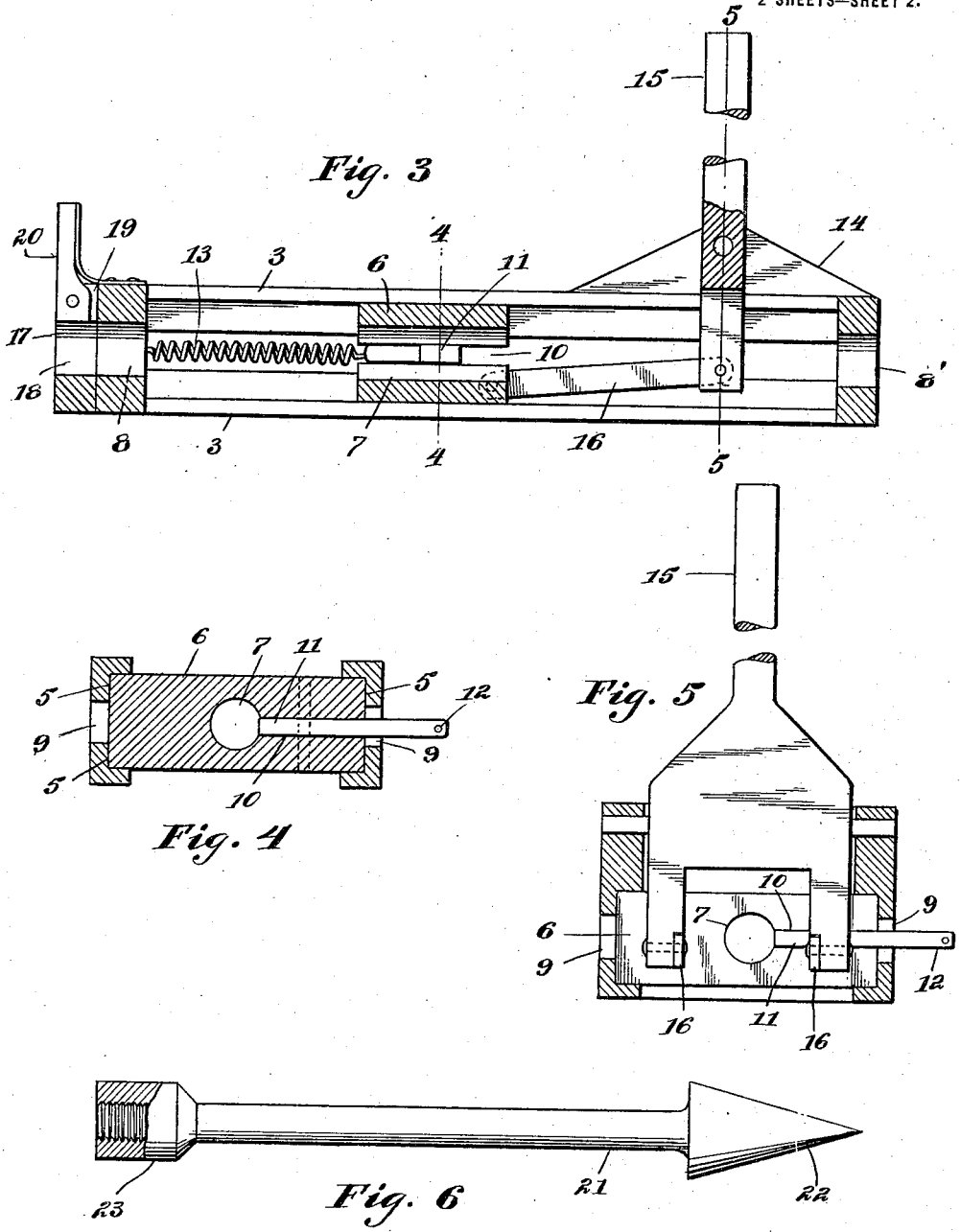

UNITED STATES PATENT OFFICE.

OLIVER G. SHURTLEFF, OF OMAHA, NEBRASKA.

PIPE-LAYING MACHINE.

1,188,336.

Specification of Letters Patent. Patented June 20, 1916.

Application filed July 9, 1915. Serial No. 38,962.

*To all whom it may concern:*

Be it known that I, OLIVER G. SHURTLEFF, a citizen of the United States, residing at Omaha, in the county of Douglas and State of Nebraska, have invented new and useful Improvements in Pipe-Laying Machines, of which the following is a specification.

This invention relates to improvements in pipe laying machines.

In carrying out the present invention it is my purpose to provide a pipe laying machine whereby the pipe to be laid may be forced through the ground without the necessity of digging a trench to receive the pipe, thereby reducing the labor required to lay the pipe and enabling the pipe to be laid in the minimum time.

It is also my purpose to provide a machine of the class described which may be operated to drive the pipe into the earth and to pull the pipe out of the ground and wherein the component parts will be so arranged and correlated as to reduce the possibility of derangement to a minimum.

With the above recited objects in view and others of a like nature, the invention consists in the construction, combination and arrangement of parts set forth herein and falling within the scope of the appended claim.

Figure 1:
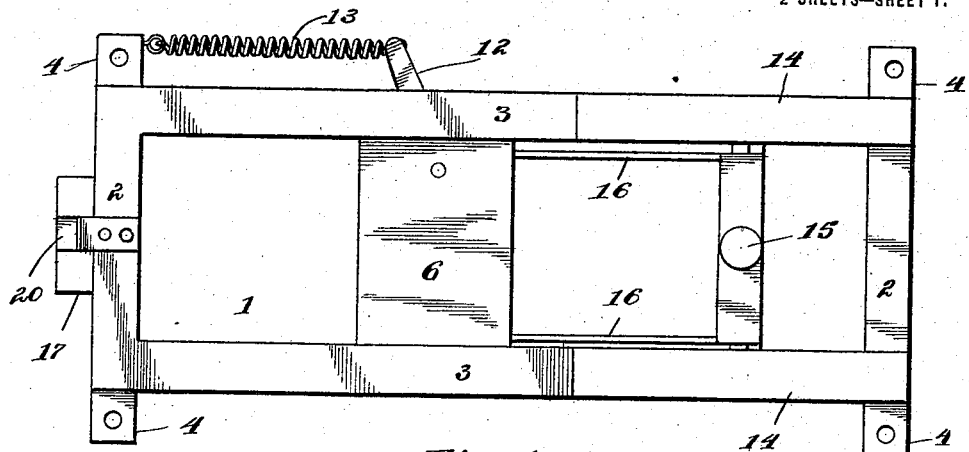
Figure 2:
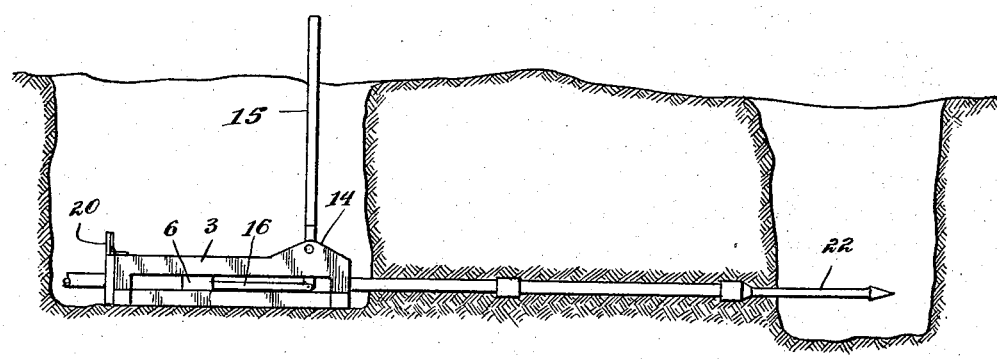

In the accompanying drawings: Figure 1 is a top plan view of a pipe laying machine constructed in accordance with my present invention; Fig. 2 is a view in side elevation of the machine, showing the same in use; Fig. 3 is a longitudinal sectional view through the machine; Fig. 4 is a cross sectional view therethrough; Fig. 5 is a like view taken on a plane parallel with Fig. 4; and Fig. 6 is a view in side elevation of the pipe head.

Referring now to the drawings in detail, 1 designates a substantially rectangular frame embodying end bars 2, 2 and longitudinal side bars 3, 3 spaced apart in parallelism and connected with the end bars 2, 2. In the present instance, the opposite ends of each end bar are formed to provide anchoring feet 4 whereby the frame may be secured to the ground to facilitate the laying of the pipe.

The confronting faces of the longitudinal side bars 3, 3 of the frame are formed with longitudinally extending grooves 5 and mounted within the grooves 5 and capable of rectilinear movement therein is a head 6 formed with a horizontal bore 7 alining axially with openings 8, 8' formed in the respective end bars of the frame. In this instance, the side walls of the grooves 5 respectively are formed with longitudinal slots 9 alining with each other, while formed in one end of the head 6 is a slot 10 contiguous to the bore 7 and opening into the slot 9 in the adjacent groove. Pivoted within the slot 10 is a pipe engaging dog 11 having the outer end thereof equipped with an outwardly projecting lever 12 connected with one extremity of a retractile spring 13, the remaining end of the spring being fastened to one of the end bars of the frame.

Suitably secured to the upper edges of the side bars 3, 3, respectively, adjacent to the end bar remote from the spring 13, are bearing blocks 14 and pivoted between the bearing blocks 14 is an operating lever 15 having the lower end thereof connected through the agency of links 16 with the head 6, and the opposite end terminating an appropriate distance above the frame. In this embodiment of the invention a block 17 is secured to the outer surface of the end bar connected with the spring 13, and this block is formed with an opening 18 co-axial with the adjacent opening 8, and with a vertical slot 19 communicating with the opening 18 and opening on to the upper end of the block and pivoted within the slot 19 is a spring-actuated holding dog 20.

21 designates a head with which the front end of the pipe being driven is equipped and this head has one end shaped after the fashion of an arrow head, as at 22, and the other end formed with a threaded socket 23 adapted to engage the threaded end of the pipe.

In practice, the excavation is made at the point where it is desired to install the machine and the machine anchored to the bottom of such excavation. One length of pipe is now passed through the alining openings 8 and the bore 7, and the forward end of such pipe is equipped with a head 21. The operating lever 15 is now swung back and forth about its fulcrum and in the swinging movement of the lever the head 6 is reciprocated within the groove 5 formed in the side bars 3, 3 of the frame. In the backward movement of the head the spring operated dog 11 idles over the adjacent portion of the pipe while the spring operated dog 20 engages the pipe and holds the latter against accidental retrograde movement, and as the head moves forwardly under the action of the lever the dog 11 grips the pipe and slides the latter within the openings in the end bars of the frame and in the forward movement of the pipe the head 21 penetrates the earth to facilitate the driving of the pipe through the ground. In the continued operation of the machine the head 6 is reciprocated and the dog 11 alternately releases and engages the section of pipe in the machine to drive such section through the earth and as one section is driven into the earth another section is passed through the alining openings and bore 7 and 8, 8, respectively, and coupled with the previously driven section so that any desired length of pipe may be driven through the ground. To draw the pipe from the earth the position of the dog 11 in the slot 10 is reversed so that the biting surface of the dog will engage the pipe in the backward movement of the head and idle over the pipe in the forward movement thereof.

While I have herein shown and described one preferred form of my invention, by way of illustration, I wish it to be understood that I do not limit or confine myself to the precise details of construction herein described and delineated, as modifications and variations may be made within the scope of the claim and without departing from the spirit of the invention.

Having thus described my invention, I claim:

A pipe laying machine comprising a rectangular frame having the confronting faces of the side bars formed with guide grooves, a head slidably mounted within said grooves and formed with a bore adapted to receive the pipe, a lever pivoted within said frame adjacent to one end thereof and adapted for swinging movement, a link connection between one end of said lever and said head whereby the head will be reciprocated in the swinging of the lever, said head being formed with a slot opening into said bore, a spring actuated dog pivoted within said slot and having one end disposed contiguous to the bore in the head and adapted to alternately engage and release the pipe in the forward and backward movement of the head, the end bars of said frame being formed with axially alining openings alining with the bore in said head, a block secured to the end bar of the frame remote from the lever and formed with an opening registering with the opening in the adjacent end bar and with a vertical slot communicating with the opening therein and opening onto the upper end of the block, and a spring actuated holding dog pivoted within said slot and adapted to grip the pipe to hold the latter against retrograde movement in the swinging of said lever to draw the head to obtain a fresh grip upon the pipe.

In testimony whereof I affix my signature in presence of two witnesses.

OLIVER G. SHURTLEFF.

Witnesses:
I. C. PAIST,
EDGAR H. CONE.

Copies of this patent may be obtained for five cents each, by addressing the "Commissioner of Patents, Washington, D. C."